Sept. 28, 1937.    A. B. SCOTT    2,094,162
FILM FEEDING APPARATUS
Filed Aug. 24, 1936    3 Sheets-Sheet 1

INVENTOR.
Albert B. Scott
BY Lyon & Lyon
ATTORNEYS

Sept. 28, 1937. A. B. SCOTT 2,094,162
FILM FEEDING APPARATUS
Filed Aug. 24, 1936   3 Sheets-Sheet 2
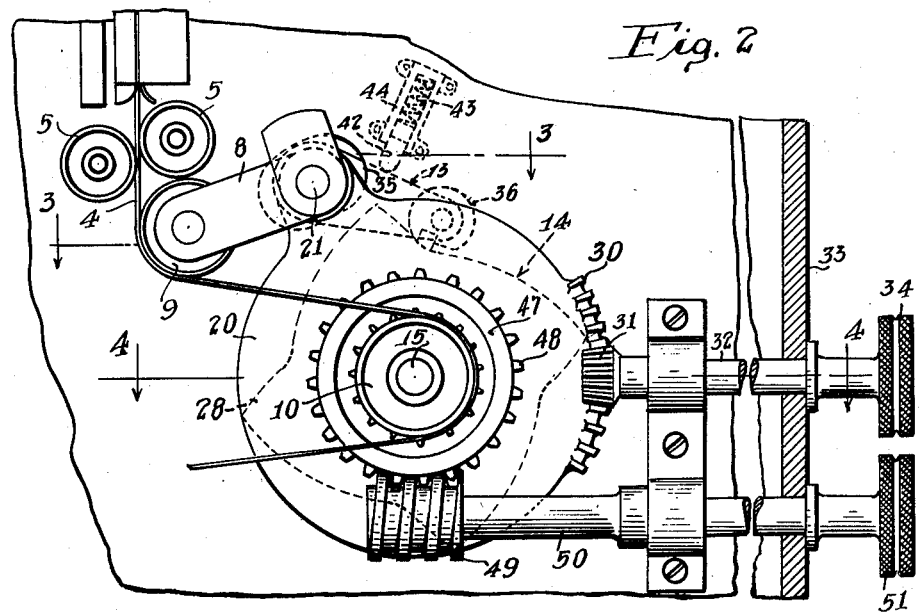
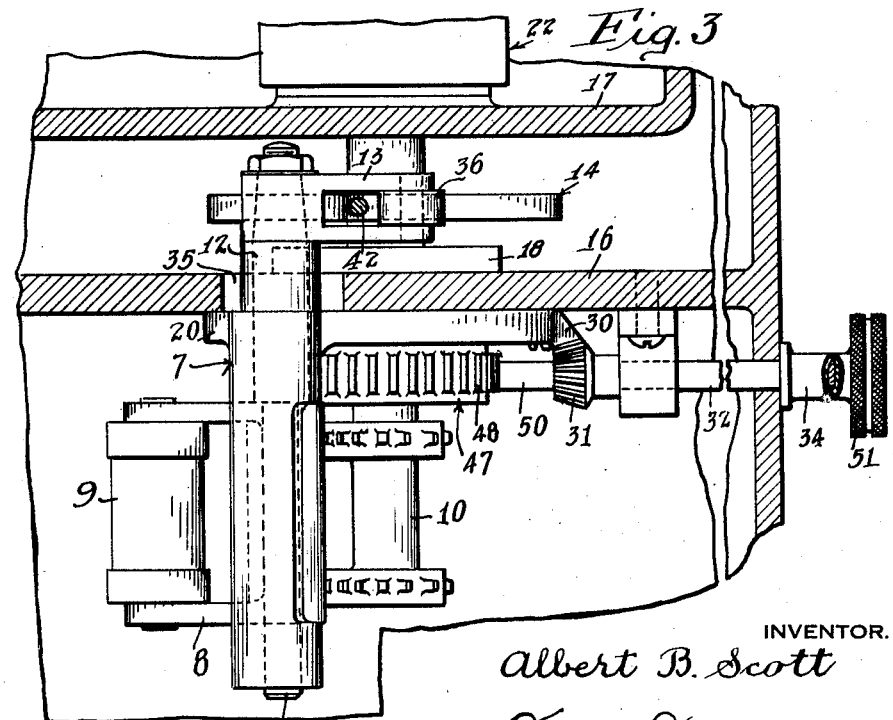
INVENTOR.
Albert B. Scott
BY Lyon & Lyon
ATTORNEYS

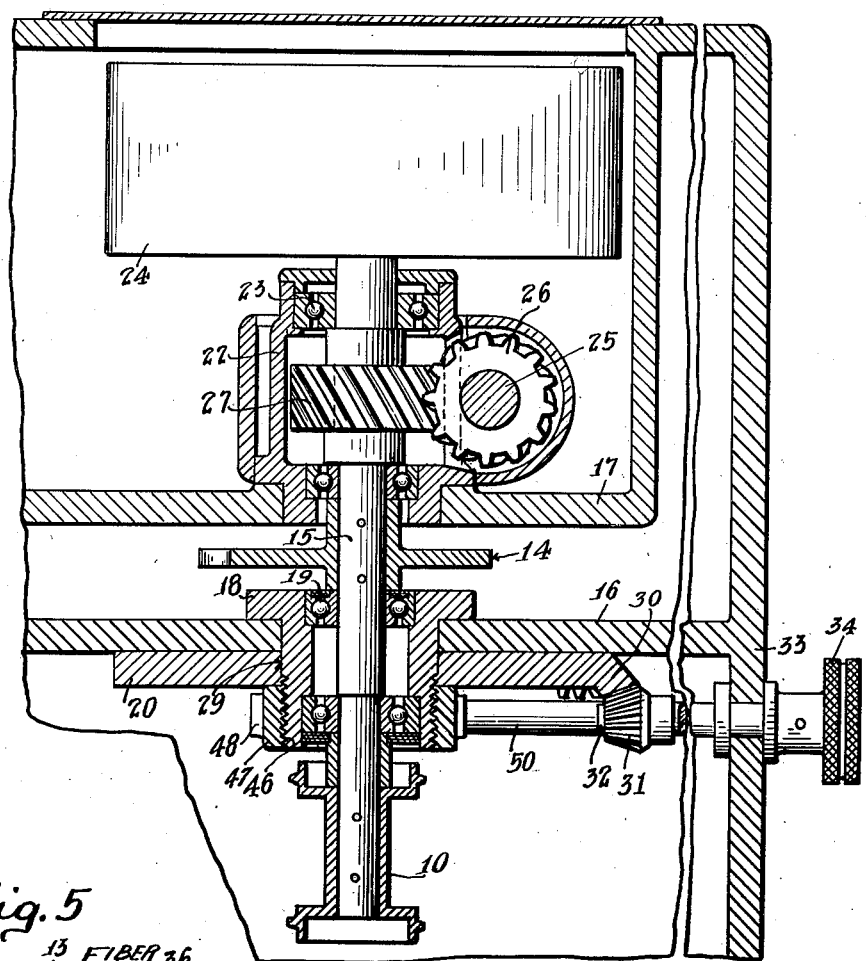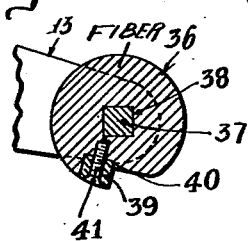

Patented Sept. 28, 1937

2,094,162

UNITED STATES PATENT OFFICE 2,094,162

FILM FEEDING APPARATUS

Albert B. Scott, Los Angeles, Calif.

Application August 24, 1936, Serial No. 97,573

10 Claims. (Cl. 88—18.6)

This invention relates to film feeding apparatus for feeding a film past the lens in a motion picture camera, or a projection machine. A common form of feed apparatus now in general use, involves the use of a reciprocating claw-carrying device that engages the perforations at the edges of the film, in order to pull the film past the axis of the lens in the feeding movement. These perforations are quite small, and the concentration of the force on them tends to injure these edges; and this is objectionable for many reasons, including the reason that it tends to throw the frames of the film out of register with the axis of the lens, and may produce a flicker of the picture on the screen when such feed apparatus is used in a projection machine.

Attempts have been made heretofore to use a rocking arm carrying a roller for pulling the film past the lens in the feeding movement. This, of course, avoids the necessity for using the claw feed device, but heretofore no practical means for framing the film has been provided with such devices.

Heretofore it has been a common practice in projection machines or cameras, to provide a vertical shaft extending down past the feed apparatus and past the sound apparatus, and this shaft has been utilized for driving such apparatus, and all of the feed rollers. When a rocker is used for advancing a film, it is, of course, necessary to rock the rocker at high speed, and as the vertical driving shaft referred to above in practice, rotates at 360 R. P. M., it becomes necessary to provide speed-up gearing for driving the rocker from this shaft.

The general object of this invention is to provide a simple feed apparatus involving the use of a rocker for pulling the film past the lens, and mounted in such a way that the film can readily be "framed", that is to say, the pictures on the screen made to frame properly on the screen.

A further object of the invention is to provide means for enabling the feed rocker to be rocked at high speed, that is to say, at a sufficient number of times per second to satisfy the present requirements in projection machines, and to accomplish this without necessitating the use of step-up speed gearing with its accompanying increase in back lash.

In its preferred embodiment, this invention involves the use of a cam having a plurality of cam points, said cam being driven preferably at substantially the same number of revolutions as the vertical drive shaft of the machine; one of the objects of this invention is to provide means for enabling this plural pointed cam to actuate the feed rocker without developing noise.

Further objects of the invention will appear hereinafter.

The invention consists in the novel parts and combination of parts to be described hereinafter, all of which contribute to produce an efficient film feeding apparatus.

A preferred embodiment of the invention is described in the following specification, while the broad scope of the invention is pointed out in the appended claims.

In the drawings:

Fig. 2 is a detailed view showing certain parts broken away and in section, of the feed apparatus. This view is an enlargement of the feed apparatus shown in Fig. 1, which is a general view.

Fig. 3 is a section taken about on the line 3—3 of Fig. 2, further illustrating details of the construction illustrated, and the means for mounting the same in the machine; in this view certain parts are broken away.

Fig. 4 is a horizontal section taken about on the line 4—4 of Fig. 2, and further illustrating details of the mechanism.

Fig. 5 is a vertical section taken at the end of the rocker arm that engages the cam, and illustrating details of the construction at this point.

Figure 1:
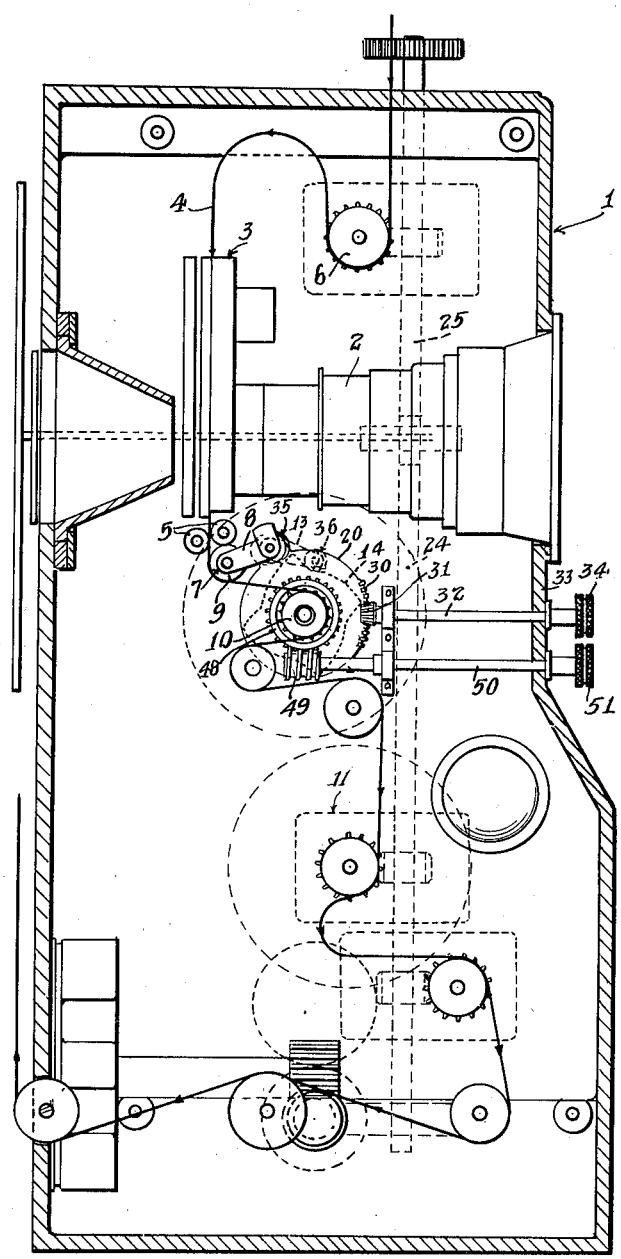
Fig. 1 is a vertical section through a projection machine embodying my invention.

Referring more particularly to the parts, 1 indicates the casing of a projection machine having a light tunnel 2 through which the light passes to the lens, and forward of this light tunnel a film guide 3 is provided through which the film 4 passes in a downward direction. As the film passes from the guide 3, it passes between two guide rollers 5, and beyond these rollers the film is engaged by the feed apparatus, which intermittently advances the film through the space equal to the width of one "frame" or picture on the film. The edges of the film are provided with the usual perforations, which engage the teeth 6 of the spools that feed the film forwardly at a uniform speed. The feed apparatus involves the use of a rocker 7 (see Figs. 2 and 3) which rocker is provided with a bifurcated arm 8 carrying a roller 9 about which the film passes, and from the roller 9 the film passes in a loop around a driving pulley 10 that is in alignment with the roller 9, and from the driving pulley 10 the film passes on down over suitable guide rollers and past the sound apparatus 11.

The body of the rocker 7 is preferably in the form of a sleeve 12 (see Fig. 3) one end of which carries an actuating arm 13, which is rigidly secured to the same, and this arm 13 is actuated by means of a cam 14.

Referring to Fig. 4, the cam 14 is rigidly secured on a shaft 15, which shaft extends through vertical frame plates 16 and 17 of the machine. The frame plate 16 with which the framing apparatus is associated, is preferably provided with a bushing 18 through which the shaft 15 passes, being mounted in suitable ball bearings 19. The rocker 7 is mounted on a carrier 20 by means of a pin 21 on the carrier, which is in the form of a shaft passing through a sleeve 12 that forms the body of the rocker. The outer end of the shaft 15 is mounted in a gear casing 22 (see Fig. 4) with suitable ball bearings 23, and the outer end of the shaft is provided with a fly wheel 24 to insure a uniform speed of rotation for the cam 14. The gear casing 22 is mounted in the frame plate, or wall 17, preferably as shown. The shaft 15 is driven at a one-to-one ratio from the main driving shaft 25 of the machine, through helical gears 26, 27. In practice, the shaft 25 would be driven at 360 R. P. M.

In order to drive the rocker 7 at a high speed, I prefer to construct the cam 14 with a plurality of cam points 28 which, in the present instance, are four in number, thereby giving the rocker 7, 1,440 movements per minute, or 24 feeding movements per second. This gives a sufficiently rapid feed movement to meet modern requirements of machines of this type. The pin carrier 20 is provided with a central opening 29, which fits neatly over the bushing 18 (see Fig. 4). I provide means for adjustably rotating the pin carrier on this bushing to frame the film, that is to say, to align the pictures on the film properly on the screen. For this purpose I provide a sector 30, which may be located along the edge of the pin carrier 20, the body of which is preferably substantially circular, as shown in Fig. 2. A pinion 31 meshes with the teeth of this sector, and the shaft 32 of this pinion extends through the rear wall 33 of the casing, and carries a thumb head 34 to enable it to be rotated. It will be evident that by rotating this pinion 31 in either direction, the pin 21 on which the rocker 7 is located, can be shifted. This change in position for the pin 21 will have the effect of changing the framing of the pictures on the screen.

The cam 14 is preferably located between the walls 16 and 17, and this necessitates extending the sleeve 12 of the rocker 7 through the wall 16; in order to enable the rocker 7 to move with the pin 21, a clearance opening 35 is provided in the wall 16, through which the sleeve 12 of the rocker passes, (see Fig. 3).

In order to actuate the arm 13 of the rocker, and also in order to substantially eliminate noise in operating it, instead of using a roller on the arm 13 for cooperating with the cam, I prefer to employ a block 36 of a shock absorbing material, such as fiber. This block is preferably mounted between the forks of the bifurcated arm 13 by means that operates to prevent rotation of the block. This preferably consists of an angular or square pin 37 (see Fig. 5) that is received in an angular, or square "bore" 38 through the block. At the point where this fiber block would touch the cam, I provide a metal tooth or die 39 that is preferably constructed of hardened steel, and secured in a notch 40 in the periphery of the block by means of a small screw 41.

The block 36 is held up against the cam resiliently, and preferably by means of a small presser foot 42 (see Fig. 2) that is formed with a round shank 43 guided in a spring barrel 44 and pressed outwardly by a spring 45 housed in the barrel.

It is advantageous to provide means for holding the pin carrier 20 rigidly in position, to prevent any vibration and any possibility of flickering of the picture on the screen. For this purpose I prefer to provide the outer end of the bushing 18 with threads 46, and on these threads I mount a nut 47, the periphery of which is formed with gear teeth 48 so that this nut constitutes a worm wheel engaging with a worm 49, and this worm is on a shaft 50 that extends out through the wall 33 (see Fig. 2), and is provided with a thumb head 51 for operating same. With this arrangement, after the picture has been framed by rotating the thumb head 34, the thumb head 51 can be rotated in the proper direction to clamp the nut 47 up against the pin carrier 20 so as to clamp it rigidly against the plate 16.

It is understood that the embodiment of the invention described herein is only one of the many embodiments this invention may take, and I do not wish to be limited in the practice of the invention, nor in the claims, to the particular embodiment set forth.

What I claim is:

1. In a film feed apparatus for a motion picture camera or projection machine, the combination of a film guide for guiding the film past the lens, a rocker having means at its end for engaging the film and around which the film passes, a pivot pin supporting the rocker, a carrier for the pivot pin mounted for adjustment around an axis, a rotary driving member for the rocker mounted to rotate on the axis of the carrier, for rocking the rocker, and means for adjustably shifting the carrier on its own axis in order to frame the film in line with the lens.

2. In a film feed apparatus for a motion picture camera or projection machine, the combination of a film guide for guiding the film past the lens, a rocker having means at its end for engaging the film and around which the film passes, a relatively fixed frame plate, a pin carrier mounted for adjustment about an axis on said relatively fixed frame plate, a pin carried by the said pin carrier and supporting the said rocker, a cam mounted for rotation on the axis of the pin carrier for rocking the rocker, and means for adjustably shifting the pin carrier on its axis of rotation in order to frame the film in line with the lens.

3. In a film feed apparatus for a motion picture camera or projection machine, the combination of a film guide for guiding the film past the lens, a rocker having means at its end for engaging the film and around which the film passes, a relatively fixed frame plate, a pin carrier mounted for adjustment about an axis on said relatively fixed frame plate, a pin carried by the said pin carrier and supporting the said rocker, a cam mounted for rotation on the axis of the pin carrier for rocking the rocker, means for adjustably shifting the pin carrier on its axis of rotation in order to frame the film in line with the lens, said pin carrier lying adjacent said relatively fixed frame plate, and means for clamping the pin carrier securely against said frame plate.

4. In a film feed apparatus for a motion picture camera or projection machine, the combination of a film guide for guiding the film past the lens, a rocker having means at its end for engaging the film and around which the film passes, a relatively fixed frame plate, a pin carrier supported for adjustable rotation on an axis on one side of said frame plate, said frame plate having an opening therein, a pin carried by said pin carrier extending through said opening to the other side of said frame plate and supporting the rocker, a cam mounted for rotation on the axis of said pin carrier for rocking the rocker, and means for adjusting the pin carrier on its axis in order to frame the film in line with the lens.

5. In a film feed apparatus for a motion picture camera or projection machine, the combination of a film guide for guiding the film past the lens, a rocker having means at its end for engaging the film and around which the film passes, a relatively fixed frame plate, a bushing mounted in the frame plate, a pin carrier supported for adjustable rotation on said bushing, said frame plate having an opening therein, a pin carried by said pin carrier extending through said opening to the other side of said frame plate and supporting the rocker, a shaft passing through the bushing, means for rotating the same, a cam carried on the said shaft for rocking the rocker, and means for adjusting the pin carrier on said bushing in order to frame the film in line with the lens.

6. In a film feed apparatus for a motion picture camera or projection machine, the combination of a film guide for guiding the film past the lens, a rocker having means at its end for engaging the film and around which the film passes, a relatively fixed frame plate, a bushing mounted in the frame plate, a pin carrier supported for adjustable rotation on said bushing, said frame plate having an opening therein, a pin carried by said pin carrier extending through said opening to the other side of said frame plate and supporting the rocker, a shaft passing through the bushing, means for rotating the same, a cam carried on the said shaft for rocking the rocker, means for adjusting the pin carrier on said bushing in order to frame the film in line with the lens, said rocker having a roller at its end for engaging the film and for pulling it through the film guide when the rocker is actuated; and a driving pulley on said shaft in line with said roller, and receiving the film from the roller.

7. A film feed apparatus for a motion picture camera or projection machine, constructed in accordance with claim 4, in which the means for adjusting the pin carrier on its axis consists of sector teeth formed on the pin carrier, and a hand-operated pinion meshing with the same.

8. In a film feed apparatus for a motion picture camera or projection machine, the combination of a film guide for guiding the film past the lens, a rocker having a roller for engaging the film and around which the film passes, a relatively fixed frame plate, a bushing mounted in the frame plate, a pin carrier mounted for adjustable rotation on the bushing and having a pin for pivotally supporting the rocker, a shaft passing through the bushing, a cam mounted on the shaft and having a plurality of cam points, said rocker having an arm with means engaging said cam, means for driving said shaft, and a film-driving pulley carried by the shaft and in line with the first-named roller.

9. In a film feed apparatus for a motion picture camera or projection machine, the combination of a film guide for guiding the film past the lens, a rocker having an arm with a roller for engaging the film and around which the film passes, a pivotal support for the rocker, a cam having a plurality of cam points, said rocker having a bifurcated second arm cooperating with said cam to rock the rocker, said second arm having a fixed block of shock-absorbing material secured between the forks thereof with a die of hard material set in the periphery thereof for engaging the cam.

10. In a film feed apparatus for a motion picture camera or projection machine, the combination of a film guide for guiding the film past the lens, a rocker having means at its end for engaging the film and around which the film passes, a pivot pin supporting the rocker, a carrier for the pivot pin having an opening mounted for adjustment around an axis at the opening, a rotary driving member for driving the rocker, a shaft carrying the rotary driving member and extending through the said opening in the carrier, and means for adjustably shifting the carrier on its own axis in order to frame the film in line with the lens.

ALBERT B. SCOTT.